(12) United States Patent
Yang

(10) Patent No.: US 11,042,876 B2
(45) Date of Patent: Jun. 22, 2021

(54) TRANSACTION METHOD AND SYSTEM BASED ON CENTRALIZED SETTLEMENT AND BLOCKCHAIN DEPOSIT CERTIFICATES

(71) Applicant: ADVANCED NEW TECHNOLOGIES CO., LTD., Grand Cayman (KY)

(72) Inventor: Xinying Yang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 17/086,013

(22) Filed: Oct. 30, 2020

(65) Prior Publication Data

US 2021/0049602 A1 Feb. 18, 2021

Related U.S. Application Data

(63) Continuation of application No. PCT/CN2019/086952, filed on May 15, 2019.

(30) Foreign Application Priority Data

Aug. 7, 2018 (CN) .......................... 201810891689.X

(51) Int. Cl.
*H04L 9/06* (2006.01)
*G06Q 20/40* (2012.01)
(Continued)

(52) U.S. Cl.
CPC .......... *G06Q 20/401* (2013.01); *G06F 9/466* (2013.01); *G06F 16/252* (2019.01); *H04L 9/0643* (2013.01); *H04L 2209/38* (2013.01)

(58) Field of Classification Search
CPC ..... G06Q 20/401; H04L 9/0643; H04L 9/466; H04L 2209/38; G06F 16/252
See application file for complete search history.

(56) References Cited

U.S. PATENT DOCUMENTS 9,965,805 B1 5/2018 Winklevoss et al.
10,269,009 B1 4/2019 Winklevoss et al.
(Continued)

FOREIGN PATENT DOCUMENTS

CN 105956923 A 9/2016
CN 106204287 A 12/2016
(Continued)

OTHER PUBLICATIONS

Written Opinion and International Search Report for PCT Application No. PCT/CN2019/086952 dated Jul. 25, 2020.
(Continued)

*Primary Examiner* — Khoi V Le

(57) ABSTRACT

A method includes: receiving, by a service logic execution module of a designated member node, a transaction request comprising a paying user identifier of a paying user, a designated resource amount, and a receiving user identifier of a receiving user, the paying user paying the designated resource amount, and the receiving user receiving the designated resource amount, wherein the designated member node is one of a plurality of member nodes of a blockchain network; prior to the blockchain network performing consensus verification on the transaction request, performing, by the service logic execution module, transaction feasibility verification off the blockchain network according to the transaction request; sending, by the service logic execution module, an account balance modification instruction to a
(Continued)

database management module of the designated member node in response to the transaction feasibility verification being successful.

20 Claims, 9 Drawing Sheets

(51) Int. Cl.
 *G06F 9/46* (2006.01)
 *G06F 16/25* (2019.01)

(56) References Cited

U.S. PATENT DOCUMENTS

| | | |
|---|---|---|
| 2016/0086187 A1 | 3/2016 | Joao |
| 2016/0092988 A1 | 3/2016 | Letourneau |
| 2016/0125040 A1 | 5/2016 | Kheterpal et al. |
| 2016/0162873 A1 | 6/2016 | Zhou et al. |
| 2016/0203448 A1 | 7/2016 | Metnick et al. |
| 2016/0292672 A1 | 10/2016 | Fay et al. |
| 2017/0017955 A1 | 1/2017 | Stern et al. |
| 2017/0091750 A1 | 3/2017 | Maim et al. |
| 2017/0124535 A1 | 5/2017 | Juels et al. |
| 2017/0132630 A1* | 5/2017 | Castinado ............ G06Q 20/382 |
| 2017/0230189 A1 | 8/2017 | Toll et al. |
| 2018/0019867 A1 | 1/2018 | Davis |
| 2018/0039667 A1* | 2/2018 | Pierce ................. G06F 16/2379 |
| 2018/0137512 A1 | 5/2018 | Georgiadis et al. |
| 2018/0260212 A1 | 9/2018 | Wisnovsky |
| 2019/0358515 A1* | 11/2019 | Tran ..................... G06Q 20/382 |

FOREIGN PATENT DOCUMENTS

| | | |
|---|---|---|
| CN | 106503589 A | 3/2017 |
| CN | 106790431 A | 5/2017 |
| CN | 107038578 A | 8/2017 |
| CN | 107423945 A | 12/2017 |
| CN | 107705113 A | 2/2018 |
| CN | 108090750 A | 5/2018 |
| CN | 108229943 A | 6/2018 |
| CN | 108364229 A | 8/2018 |
| CN | 109242453 A | 1/2019 |
| TW | I608434 B | 12/2017 |
| WO | 2017139112 A1 | 8/2017 |

OTHER PUBLICATIONS

Search Report for Taiwanese Application No. 108108219 dated Feb. 4, 2020.
First Search for Chinese Application No. 201810891689.X dated Apr. 8, 2020.
Supplementary Search for Chinese Application No. 201810891689.X dated Sep. 21, 2020.

* cited by examiner

Transaction system based on centralized settlement and blockchain attestation

TRANSACTION METHOD AND SYSTEM BASED ON CENTRALIZED SETTLEMENT AND BLOCKCHAIN DEPOSIT CERTIFICATES

CROSS REFERENCE TO RELATED APPLICATIONS

The present application is a continuation application of the International Patent Application No. PCT/CN2019/086952, filed on May 15, 2019, and titled "TRANSACTION METHOD AND SYSTEM BASED ON CENTRALIZED SETTLEMENT AND BLOCKCHAIN DEPOSIT CERTIFICATES," which claims priority to Chinese Patent Application No. 201810891689.X filed on Aug. 7, 2018. The entire contents of all of the above applications are incorporated herein by reference in their entirety.

TECHNICAL FIELD

Embodiments of this specification relate to the field of information technologies, and in particular, to a transaction method and system based on centralized settlement and blockchain attestation.

BACKGROUND

Currently, the main mode of online electronic transaction is that a centralized settlement platform (such as a bank or Alipay) is responsible for managing an account of a user, transactions between users are executed and recorded by using the settlement platform, and the users may query the settlement platform for income and expenditure records of the accounts of the users for verification.

However, the income and expenditure records of the user account stored in the settlement platform may be tampered with, and therefore cannot be used as a trusted account reconciliation credential.

SUMMARY

To resolve the problem of untrusted income and expenditure records of a user account stored in a centralized settlement platform, embodiments of this specification provide a transaction method and system based on centralized settlement and blockchain attestation, and the technical solutions are as follows:

According to a first aspect of the embodiments of this specification, a transaction method based on centralized settlement and blockchain attestation is provided, where a blockchain network includes a plurality of member nodes, a virtual resource account is registered by a user with a designated member node, the designated member node includes a service logic execution module, a database management module, and a blockchain function module, and the method includes: receiving, by the service logic execution module, a transaction request including a paying user identifier of a paying user, a designated resource amount, and a receiving user identifier of a receiving user, the paying user being a user paying the designated resource amount, and the receiving user being a user receiving the designated resource amount; performing, by the service logic execution module, transaction feasibility verification according to the transaction request, and sending an account balance modification instruction to the database management module after the verification is successful; performing, by the database management module, an account balance modification operation according to the account balance modification instruction, and generating a log file used for recording the account balance modification operation, the account balance modification operation comprising deducting the designated resource amount from a virtual resource account corresponding to the paying user identifier and adding the designated resource amount to a virtual resource account corresponding to the receiving user identifier; sending, by the database management module, the log file to the blockchain function module; and broadcasting, by the blockchain function module, the log file to the blockchain network, for the member nodes to publish the log file to a blockchain based on a consensus mechanism.

According to a second aspect of the embodiments of this specification, a transaction device based on centralized settlement and blockchain attestation is provided, where a blockchain network includes a plurality of member nodes, the device is any of the member nodes, a virtual resource account is registered by a user with the device, and the device includes a service logic execution module, a database management module, and a blockchain function module, where the service logic execution module receives a transaction request including a paying user identifier of a paying user, a designated resource amount, and a receiving user identifier of a receiving user, the paying user being a user paying the designated resource amount, and the receiving user being a user receiving the designated resource amount; and performs transaction feasibility verification according to the transaction request, and sends an account balance modification instruction to the database management module after the verification is successful; the database management module performs an account balance modification operation according to the account balance modification instruction, and generates a log file used for recording the account balance modification operation, the account balance modification operation comprising deducting the designated resource amount from a virtual resource account corresponding to the paying user identifier and adding the designated resource amount to a virtual resource account corresponding to the receiving user identifier; and sends the log file to the blockchain function module; and the blockchain function module broadcasts the log file to the blockchain network, for the member nodes to publish the log file to a blockchain based on a consensus mechanism.

In some embodiments, a method comprises receiving, by a service logic execution module of a designated member node, a transaction request comprising a paying user identifier of a paying user, a designated resource amount, and a receiving user identifier of a receiving user, the paying user being a user paying the designated resource amount, and the receiving user being a user receiving the designated resource amount, wherein the designated member node is one of a plurality of member nodes of a blockchain network; prior to the blockchain network performing consensus verification on the transaction request, performing, by the service logic execution module, transaction feasibility verification off the blockchain network according to the transaction request; sending, by the service logic execution module, an account balance modification instruction to a database management module of the designated member node in response to the transaction feasibility verification being successful; performing, by the database management module, an account balance modification operation off the blockchain network according to the account balance modification instruction; generating, by the database management module, a log file recording the account balance modification operation, the account balance modification operation comprising deducting the designated resource amount from a virtual resource account corresponding to the paying user identifier and adding the designated resource amount to a virtual resource account corresponding to the receiving user identifier; prior to the blockchain network performing the consensus verification on the transaction request, sending, by the database management module, the log file to a blockchain function module of the designated member node; and broadcasting, by the blockchain function module, a blockchain transaction comprising the log file to the blockchain network, for the plurality of member nodes to publish the blockchain transaction to a blockchain based on a consensus mechanism.

In some embodiments, broadcasting, by the blockchain function module, the blockchain transaction to the blockchain network comprises: generating, by the blockchain function module, a log file summary by applying a hash algorithm to the log file; and broadcasting, by the blockchain function module, the blockchain transaction to the blockchain network, for the plurality of member nodes to publish the log file and the log file summary to the blockchain based on the consensus mechanism, wherein the blockchain transaction comprises the log file and the log file summary.

In some embodiments, the method further comprises: sending, by the blockchain function module, the log file summary to the database management module; sending, by the database management module, the log file summary to the service logic execution module; and sending, by the service logic execution module, the log file summary to the paying user and/or the receiving user, for the paying user and/or the receiving user to query the blockchain for the log file by using the log file summary.

In some embodiments, sending, by the blockchain function module, the log file summary to the database management module comprises: determining, by the blockchain function module, whether the log file is published to the blockchain by querying the blockchain; and in response to determining that the log file is published to the blockchain, sending, by the blockchain function module, the log file summary to the database management module.

In some embodiments, sending, by the database management module, the log file summary to the service logic execution module comprises: sending, by the database management module, the log file summary and a modification success notification of the account balance modification operation to the service logic execution module.

In some embodiments, broadcasting the blockchain transaction comprising the log file to the blockchain network comprises: broadcasting the blockchain transaction to the blockchain network, for the plurality of member nodes to perform consensus verification on the blockchain transaction without performing the transaction feasibility verification on the transaction request.

In some embodiments, the log file comprises a software operation history of performing the account balance modification operation.

In some embodiments, the transaction feasibility verification comprises verifying whether the transaction request is executable and whether the paying user has authorization to order the transaction request.

In some embodiments, one or more non-transitory computer-readable storage media stores instructions executable by one or more processors, wherein execution of the instructions causes the one or more processors to perform operations comprising: receiving a transaction request comprising a paying user identifier of a paying user, a designated resource amount, and a receiving user identifier of a receiving user, the paying user being a user paying the designated resource amount, and the receiving user being a user receiving the designated resource amount; prior to a blockchain network performing consensus verification on the transaction request, performing transaction feasibility verification off the blockchain network according to the transaction request; generating an account balance modification instruction in response to the transaction feasibility verification being successful; performing an account balance modification operation off the blockchain network according to the account balance modification instruction; prior to the blockchain network performing the consensus verification on the transaction request, generating a log file recording the account balance modification operation, the account balance modification operation comprising deducting the designated resource amount from a virtual resource account corresponding to the paying user identifier and adding the designated resource amount to a virtual resource account corresponding to the receiving user identifier; and broadcasting a blockchain transaction comprising the log file to the blockchain network, for a plurality of member nodes of the blockchain network to publish the blockchain transaction to a blockchain based on a consensus mechanism.

In some embodiments, a system comprises one or more processors and one or more non-transitory computer-readable memories coupled to the one or more processors and configured with instructions executable by the one or more processors to cause the system to perform operations comprising: receiving a transaction request comprising a paying user identifier of a paying user, a designated resource amount, and a receiving user identifier of a receiving user, the paying user being a user paying the designated resource amount, and the receiving user being a user receiving the designated resource amount; prior to a blockchain network performing consensus verification on the transaction request, performing transaction feasibility verification off the blockchain network according to the transaction request; generating an account balance modification instruction in response to the transaction feasibility verification being successful; performing an account balance modification operation off the blockchain network according to the account balance modification instruction; prior to the blockchain network performing the consensus verification on the transaction request, generating a log file recording the account balance modification operation, the account balance modification operation comprising deducting the designated resource amount from a virtual resource account corresponding to the paying user identifier and adding the designated resource amount to a virtual resource account corresponding to the receiving user identifier; and broadcasting a blockchain transaction comprising the log file to the blockchain network, for a plurality of member nodes of the blockchain network to publish the blockchain transaction to a blockchain based on a consensus mechanism.

In the technical solutions provided in the embodiments of this specification, a blockchain network includes a plurality of member nodes, a virtual resource account is registered by a user with a designated member node, and the designated member node includes a service logic execution module, a database management module, and a blockchain function module. When the designated member node receives a transaction request, the service logic execution module performs transaction feasibility verification according to the transaction request, and the database management module is instructed to perform an account balance modification operation after the verification is successful. That is, the designated resource amount is deducted from a virtual resource account corresponding to the paying user identifier, and the designated resource amount is added to a virtual resource account corresponding to the receiving user identifier. Moreover, the database management module further generates a log file used for recording the account balance modification operation, and sends the log file to the blockchain function module. The blockchain function module broadcasts the log file to the blockchain network, for the member nodes to publish the log file to a blockchain based on a consensus mechanism. In other words, for a transaction, a log file generated when the designated member node performs transaction settlement is published to the blockchain for attestation, which is equivalent to publishing income and expenditure records of a user account stored in a centralized settlement platform to the blockchain for attestation. Therefore, the income and expenditure records of the user account are difficult to be tampered with, and may be used as a trusted account reconciliation credential.

It should be understood that the foregoing general description and detailed description in the following are merely exemplary and explanative, and cannot constitute a limitation to the embodiments of this specification.

In addition, any one of the embodiments of this specification does not need to achieve all the foregoing effects.

BRIEF DESCRIPTION OF THE DRAWINGS

To describe the technical solutions in the embodiments of this specification or in the existing technologies more clearly, the following briefly describes the accompanying drawings required for describing the embodiments or the existing technologies. Apparently, the accompanying drawings in the following description show merely some of the embodiments of this specification, and a person of ordinary skill in the art may still derive other drawings from the accompanying drawings.

DETAILED DESCRIPTION

To enable a person skilled in the art to better understand technical solutions in the embodiments of this specification, the technical solutions in the embodiments of this specification are described in detail below with reference to the accompanying drawings in the embodiments of this specification. Obviously, the described embodiments are only a part of the embodiments of this specification, other than all of the embodiments. Based on the embodiments in this specification, all other embodiments obtained by a person of ordinary skill in the art should fall within the protection scope.

The technical solutions provided in the embodiments of this specification are described in detail below with reference to the accompanying drawings.

Figure 1:
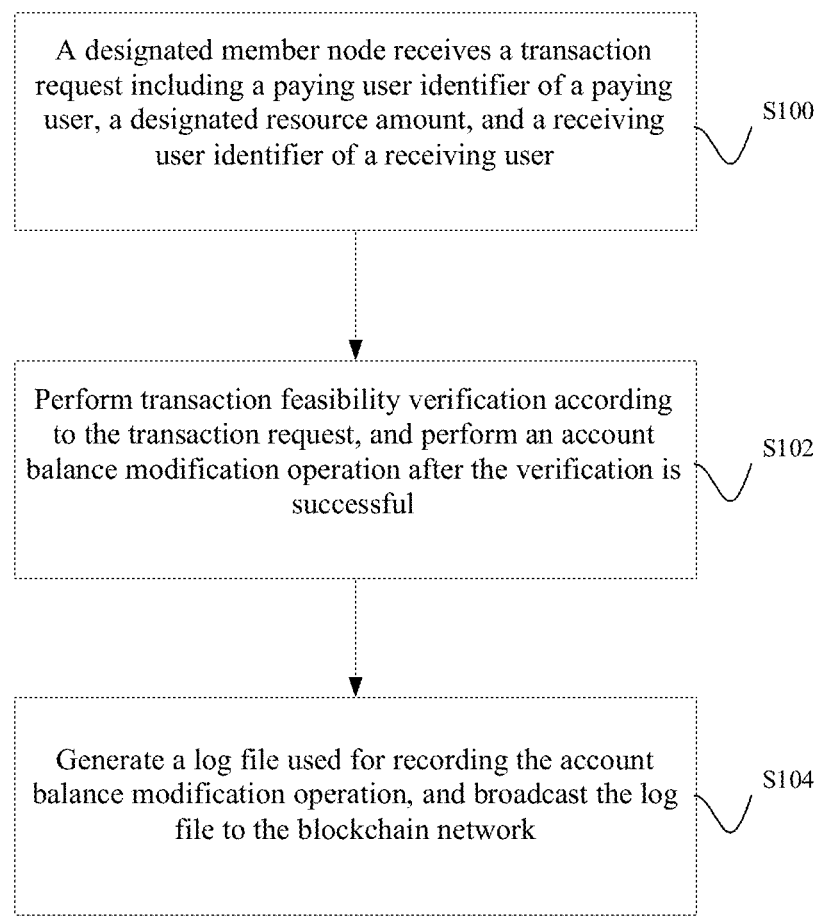
FIG. 1 is a schematic flowchart of a transaction method based on centralized settlement and blockchain attestation, according to some embodiments.

FIG. 1 is a schematic flowchart of another transaction method based on centralized settlement and blockchain attestation, according to some embodiments. The method includes the following steps:

S100. A designated member node receives a transaction request including a paying user identifier of a paying user, a designated resource amount, and a receiving user identifier of a receiving user. In some embodiments, a service logic execution module of a designated member node receives a transaction request comprising a paying user identifier of a paying user, a designated resource amount, and a receiving user identifier of a receiving user, the paying user being a user paying the designated resource amount, and the receiving user being a user receiving the designated resource amount, wherein the designated member node is one of a plurality of member nodes of a blockchain network.

In this embodiment of this specification, a blockchain network includes a plurality of member nodes. In this specification, a "node" may be one or more devices managed by a management party (a person or an institution), and management parties to which the member nodes respectively correspond may be different.

In this embodiment of this specification, a virtual resource account is registered by a user with the designated member node. The designated member node may be designated according to actual service needs. For example, assuming that the blockchain network is a consortium blockchain network formed by 10 financial institutions (including banks and electronic payment platforms), a member node managed by an electronic payment platform may be designated as a designated member node, and a virtual resource account is registered by a user with the electronic payment platform.

In some embodiments, the virtual resource account registered by the user with the designated member node is actually maintained in a relational database of the designated member node.

A virtual resource described in this specification is not limited to an electronic currency, and may be a bonus point, a game currency, a virtual object, and the like. In short, a transaction may be performed between users by using any virtual resource as a transaction medium according to actual service rules.

In step S100, the designated member node may receive a transaction request sent by the paying user, or may receive a transaction request sent by the receiving user. The transaction request may include a paying user identifier of a paying user, a designated resource amount, and a receiving user identifier of a receiving user, the paying user being a user paying the designated resource amount, and the receiving user being a user receiving the designated resource amount.

S102. Perform transaction feasibility verification according to the transaction request, and perform an account balance modification operation after the verification is successful. In some embodiments, prior to the blockchain network performing consensus verification on the transaction request, the service logic execution module may perform transaction feasibility verification off the blockchain network according to the transaction request. The service logic execution module may send an account balance modification instruction to a database management module of the designated member node in response to the transaction feasibility verification being successful. The database management module may perform an account balance modification operation off the blockchain network according to the account balance modification instruction.

In this specification, the transaction feasibility verification refers to verifying whether a transaction is reasonable and executable, which mainly includes verifying whether an account balance of the paying user is sufficient. In addition, in practice, other items of the transaction may also be the subject of feasibility verification according to actual service rules, for example, whether the paying user has authorization. If the verification is successful, it indicates that the transaction is reasonable and executable. In some embodiments, the transaction feasibility verification comprises verifying whether the transaction request is executable and whether the paying user has authorization to order the transaction request.

If feasibility verification performed by the designated member node according to the transaction request is successful, an account balance modification operation is performed. That is, the designated resource amount is deducted from a virtual resource account corresponding to the paying user identifier, and the designated resource amount is added to a virtual resource account corresponding to the receiving user identifier.

In some embodiments, the designated member node may perform transaction feasibility verification on the transaction request off the blockchain network (e.g., locally at the designated member node), and perform an account balance modification operation off the blockchain network after the verification is successful. In some embodiments, S102 may be performed off the blockchain network by the designated member node (e.g., in a centralized manner). This may expedite the transaction feasibility verification of the transaction request, as compared to the traditional confirmation in a decentralized manner by blockchain nodes of the blockchain network. This improves the computer functionality of the blockchain computer network, because the computing burden on consensus verification of a blockchain transaction including the transaction request (which traditionally includes performing the transaction feasibility verification by the network of blockchain nodes in a decentralized manner) is reduced, and the computing speed of consensus verifying the blockchain transaction is increased.

In some embodiments, the designated member node may perform an account balance modification in a first storage of the designated member node. The designated member node may update a copy of each of the blockchain stored in a second storage of the designated member node to include the blockchain transaction. The first and second storages may be different and separate physical storage spaces, such that the transaction feasibility verification is performed off the blockchain network, and the broadcast of the blockchain transaction is performed on the blockchain network.

In some embodiments, broadcasting, by the blockchain function module, the blockchain transaction to the blockchain network comprises: generating, by the blockchain function module, a log file summary by applying a hash algorithm to the log file; and broadcasting, by the blockchain function module, the blockchain transaction to the blockchain network, for the plurality of member nodes to publish the log file and the log file summary to the blockchain based on the consensus mechanism, wherein the blockchain transaction comprises the log file and the log file summary.

S104. Generate a log file used for recording the account balance modification operation, and broadcast the log file to the blockchain network. In some embodiments, the database management module may generate a log file recording the account balance modification operation, the account balance modification operation including deducting the designated resource amount from a virtual resource account corresponding to the paying user identifier and adding the designated resource amount to a virtual resource account corresponding to the receiving user identifier. Prior to the blockchain network performing consensus verification on the transaction request, the database management module may send the log file to a blockchain function module of the designated member node. The blockchain function module may broadcast a blockchain transaction comprising the log file to the blockchain network, for the plurality of member nodes to publish the blockchain transaction to a blockchain based on a consensus mechanism.

In some embodiments, broadcasting the blockchain transaction comprising the log file to the blockchain network includes: broadcasting the blockchain transaction to the blockchain network, for the plurality of member nodes to perform consensus verification on the blockchain transaction without performing the transaction feasibility verification on the transaction request. As shown above, the designated member node performs the transaction feasibility verification before the consensus verification phase of the blockchain transaction by the blockchain nodes of the blockchain network starts, such that during the consensus verification phase, the transaction feasibility verification no longer needs to be performed by the blockchain nodes of the blockchain network. The computing burden of the blockchain network is thus reduced, and the computing speed of the blockchain network is enhanced.

In step S104, the designated member node may generate a log file used for recording the account balance modification operation. In some embodiments, the log file is a record file or a file set used for recording an operation event of a software system (such as a windows system, a service logic processing system, and a database management system). A suffix of the log file is generally .log. In some embodiments, the log file comprises a software operation history of performing the account balance modification operation in the database.

After generating the log file, the designated member node may broadcast the log file to the blockchain network, for the member nodes to publish the log file to a blockchain based on a consensus mechanism.

In some embodiments, the blockchain network does not need to verify feasibility of the transaction request according to the log file, provided that the member nodes publish the log file to the blockchain based on the consensus mechanism.

In some embodiments, an execution sequence of step S102 and step S104 is not limited. Step S104 may be performed after step S102 is performed, or step S102 may be performed after step S104 is performed, or step S102 and step S104 may be performed at the same time.

Through the transaction method based on centralized settlement and blockchain attestation shown in FIG. 1, for a transaction, a log file generated when the designated member node performs transaction settlement is published to a blockchain for attestation, which is equivalent to publishing income and expenditure records of a user account stored in a centralized settlement platform to the blockchain for attestation. Therefore, the income and expenditure records of the user account are difficult to be tampered with, and may be used as a trusted account reconciliation credential.

Figure 2A:
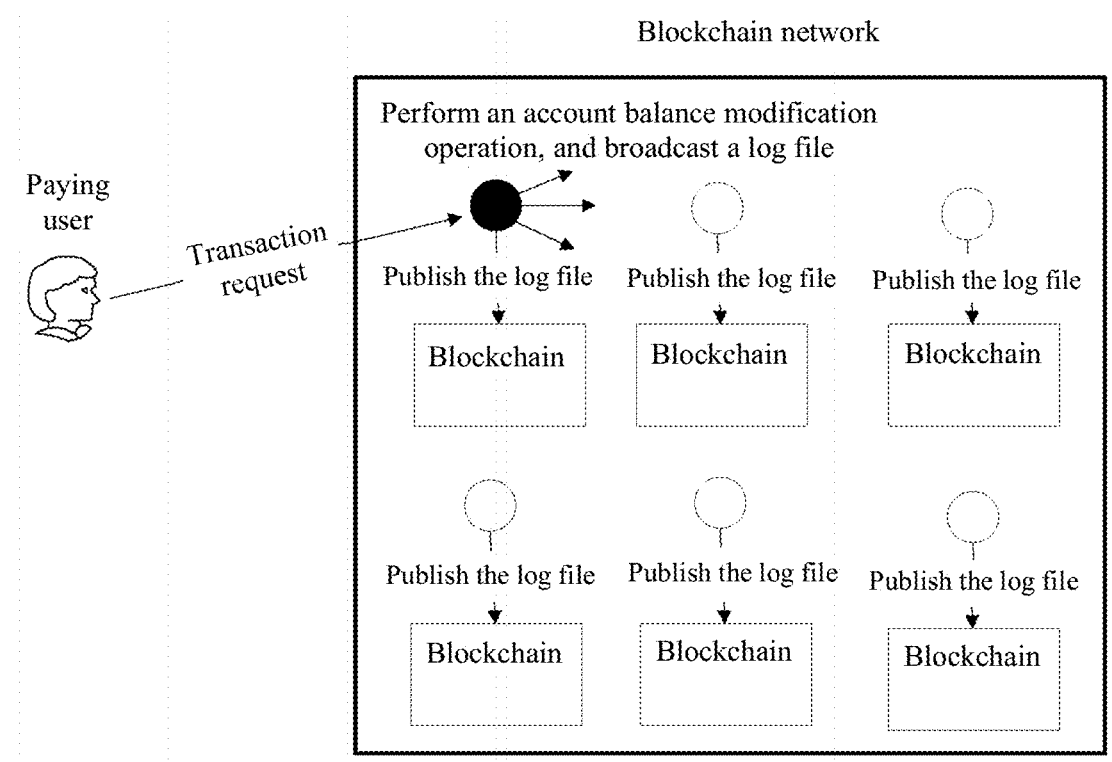
FIG. 2a is an exemplary flowchart of a transaction method based on centralized settlement and blockchain attestation, according to some embodiments.

FIG. 2a is an exemplary flowchart of a transaction method based on centralized settlement and blockchain attestation, according to some embodiments. As shown in FIG. 2a, a blockchain network is formed by a plurality of member nodes (6 member nodes are shown in the figure). A solid circle is a designated member node, and hollow circles are member nodes other than the designated member node. A paying user may initiate a transaction, and send a transaction request to the designated member node. The designated member node first locally performs an account balance modification operation, generates a log file for recording the account balance modification operation, and then broadcasts the log file to the whole network, for the member nodes to publish the log file to the blockchain at the member nodes. It is worth emphasizing that, the designated member node needs to perform feasibility verification on the transaction, but the blockchain network does not need to perform feasibility verification on the transaction.

In addition, in this embodiment of this specification, the designated member node may generate a log file summary corresponding to the log file according to the log file by using a hash algorithm, and then broadcast the log file and the log file summary to the blockchain network, for the member nodes to publish the log file and the log file summary to the blockchain based on a consensus mechanism.

In addition, the designated member node may send the log file summary to the paying user and/or the receiving user, for the paying user and/or the receiving user to query the blockchain for the log file by using the log file summary.

For a piece of information, a summary (a string) of the piece of information may be obtained by performing a hash operation, and may uniquely identify the piece of information. Therefore, the log file summary may be used as an identifier of the log file. After the log file summary is provided to the paying user and/or the receiving user, the paying user or the receiving user can query the blockchain for the log file by using the log file summary as a clue, to determine that the designated member node has performed the account balance modification operation.

In practice, after broadcast to the member nodes, the log file is respectively stored into caches (or referred to as transaction pools) of the member nodes. When a designated consensus trigger condition is met (for example, after a designated period), a member node is selected from the member nodes based on a consensus mechanism to retrieve several log files and corresponding log file summaries from a transaction pool. The member node packs the log files and the log file summaries into a block, and broadcasts the block to the whole network, for the member nodes to respectively publish the block to the blockchain. In this way, the foregoing log file and log file summary are attested.

Therefore, in this embodiment of this specification, the designated member node may further send the log file summary to the paying user and/or the receiving user after it is determined that the log file is published to the blockchain.

In this case, when the paying user and/or the receiving user receive the log file summary sent by the designated member node, it means that the transaction is successful. If the paying user and/or the receiving user does not receive the log file summary, even if the designated member node has performed the account balance modification operation, it does not mean that the transaction is successful (because the log file has not been published to the blockchain).

In addition, the designated member node may alternatively send the log file summary to the paying user and/or the receiving user after it is determined that the log file is packed into a block.

In addition, the designated member node may include a service logic execution module, a database management module, and a blockchain function module.

The service logic execution module is responsible for outward interfacing with a user, and processing a service according to a service request of the user. The service logic execution module may be software installed on the designated member node, or may be a hardware component of the designated member node.

The database management module is responsible for managing a local database of the designated member node, for example, modifying data in the database. The database management module may be software installed on the designated member node, or may be a hardware component of the designated member node.

The blockchain function module is an interface through which the designated member node accesses to the blockchain network, and may be software installed on the designated member node, or may be a hardware component of the designated member node.

In this way, in step S100, the designated member node may receive the transaction request by using the service logic execution module. In step S102, the designated member node performs the transaction feasibility verification according to the transaction request by using the service logic execution module, and performs the account balance modification operation by using the database management module if the verification is successful.

Figure 2B:
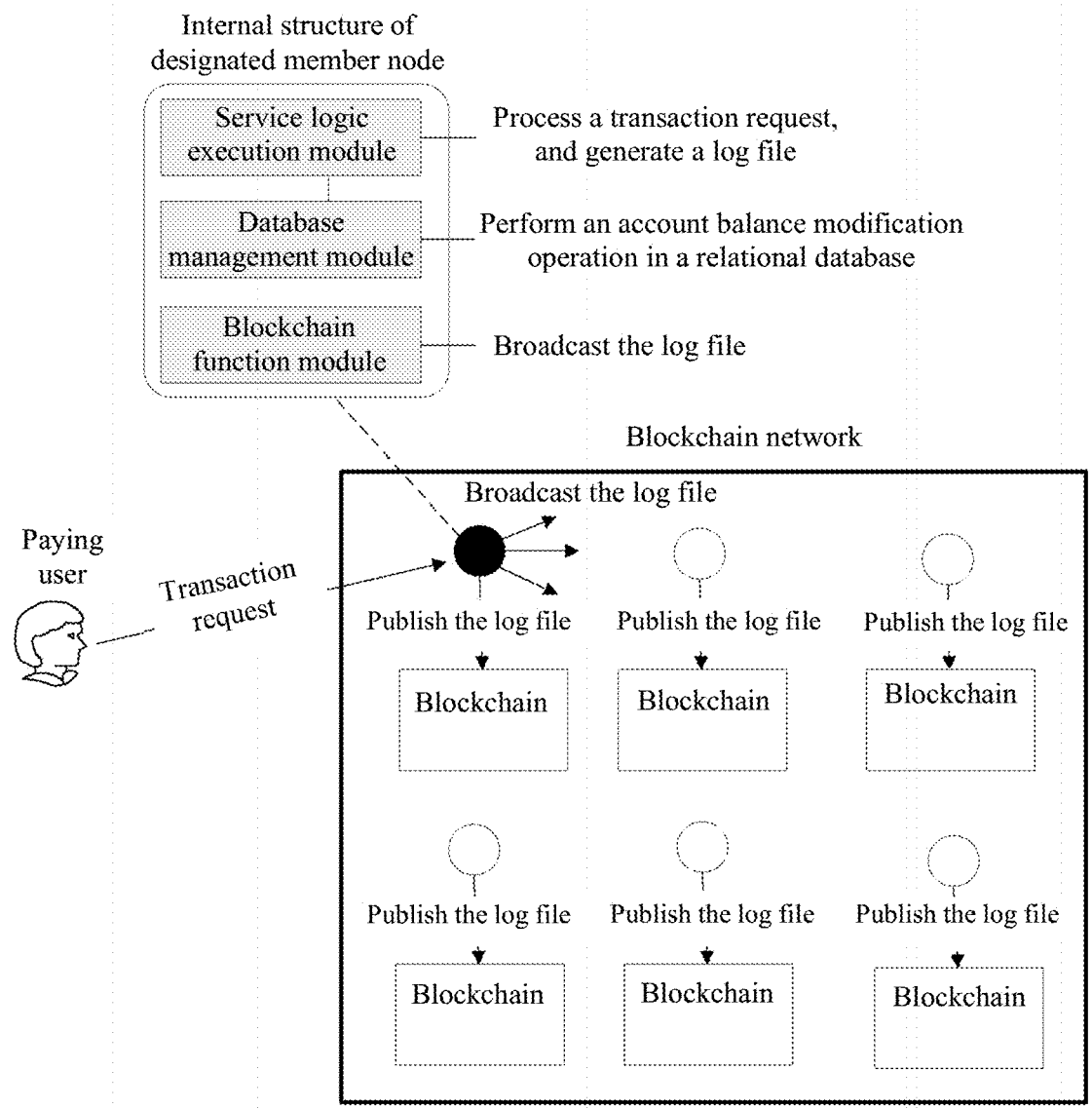
FIG. 2b is an exemplary flowchart of another transaction method based on centralized settlement and blockchain attestation, according to some embodiments.
Figure 2C:
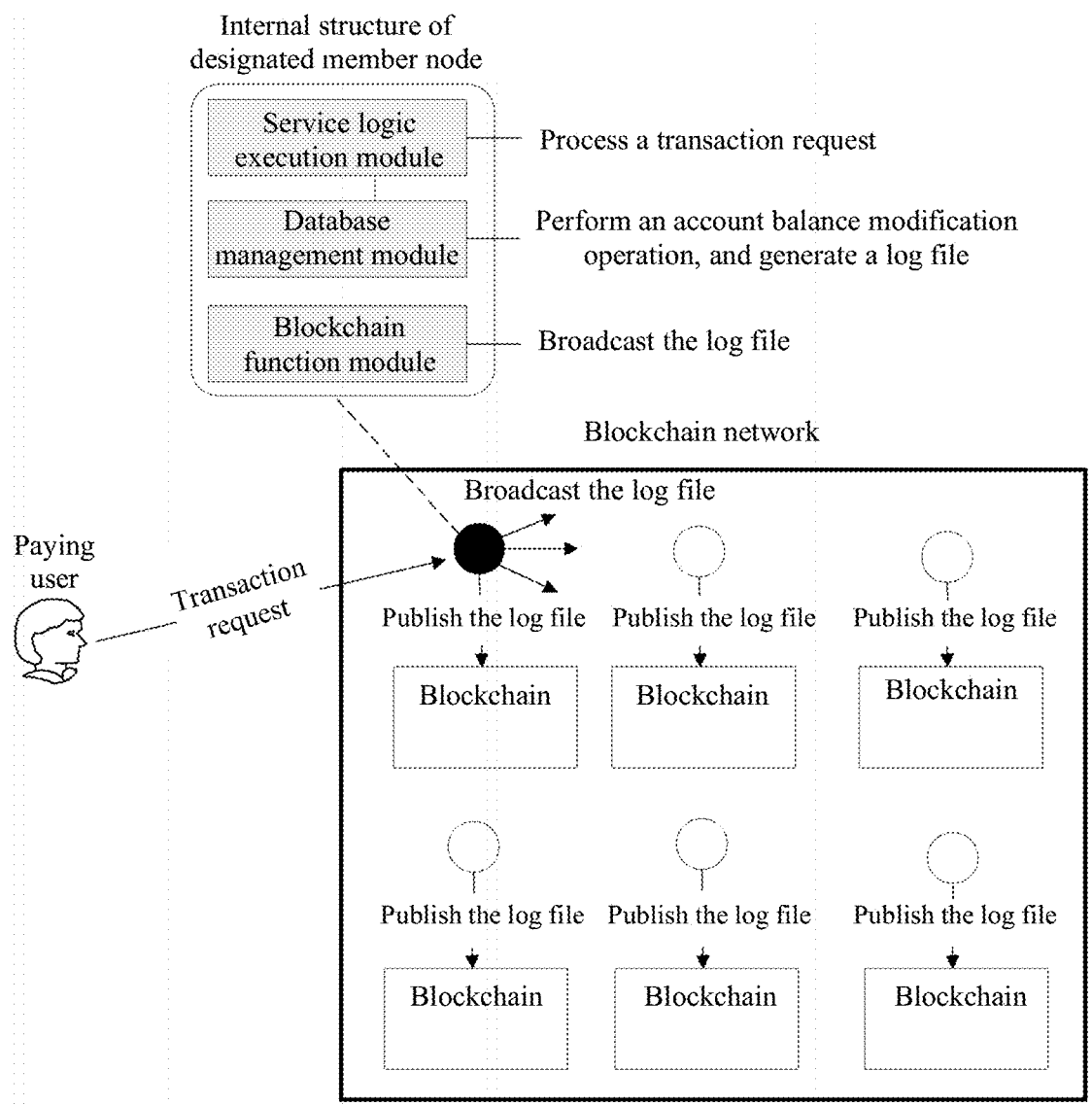
FIG. 2c is an exemplary flowchart of another transaction method based on centralized settlement and blockchain attestation, according to some embodiments.

In step S104, the designated member node may generate the log file by using the service logic execution module (referring to FIG. 2b), or may generate the log file by using the database management module (referring to FIG. 2c). Next, the designated member node may broadcast the log file to the blockchain network by using the blockchain function module, and then publish the log file to a blockchain at the designated member node by using the blockchain function module.

Figure 3:
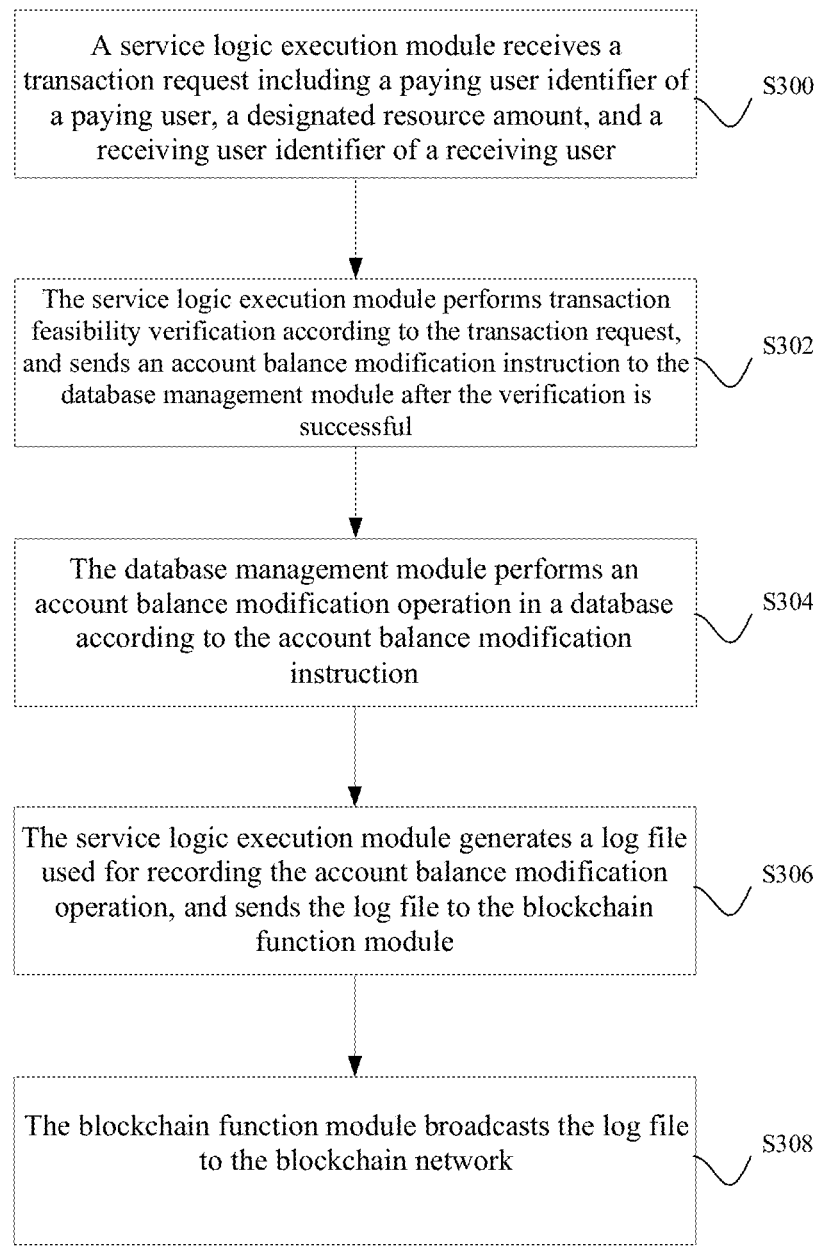
FIG. 3 is a schematic flowchart of another transaction method based on centralized settlement and blockchain attestation, according to some embodiments.

FIG. 3 is a schematic flowchart of another transaction method based on centralized settlement and blockchain attestation, according to some embodiments. The method includes the following steps:

S300. A service logic execution module receives a transaction request including a paying user identifier of a paying user, a designated resource amount, and a receiving user identifier of a receiving user.

In the method shown in FIG. 3, a blockchain network includes a plurality of member nodes, a virtual resource account is registered by a user with a designated member node, and the designated member node includes the service logic execution module, a database management module, and a blockchain function module.

S302. The service logic execution module performs transaction feasibility verification according to the transaction request, and sends an account balance modification instruction to the database management module after the verification is successful.

S304. The database management module performs an account balance modification operation in a database according to the account balance modification instruction.

In the method shown in FIG. 3, the service logic execution module is responsible for accepting the transaction request and performing the transaction feasibility verification. After the verification is successful, the service logic execution module may instruct the database management module to perform the account balance modification operation. That is, the designated resource amount is deducted from a virtual resource account corresponding to the paying user identifier, and the designated resource amount is added to a virtual resource account corresponding to the receiving user identifier.

S306. The service logic execution module generates a log file used for recording the account balance modification operation, and sends the log file to the blockchain function module.

In the method shown in FIG. 3, the service logic execution module is responsible for generating the log file and sending the generated log file to the blockchain function module.

For example, a log file generating logic may be written into the service logic execution module in advance, and is performed by the service logic execution module. The log file generating logic may not only include a logic for recording the account balance modification operation, but also may include a logic for recording other transaction-related information (e.g., a transaction time point, a transaction location, a transaction postscript, etc.).

In the method shown in FIG. 3, after performing the account balance modification operation, the database management module may return a modification success notification of the account balance modification operation to the service logic execution module. After receiving the modification success notification, the service logic execution module may generate the log file used for recording the account balance modification operation.

S308. The blockchain function module broadcasts the log file to the blockchain network, for the member nodes to publish the log file to a blockchain based on a consensus mechanism.

In step S308, the blockchain function module is responsible for broadcasting the log file to the blockchain network.

In addition, in step S308, the blockchain function module may, for example, generate a log file summary corresponding to the log file according to the log file by using a hash algorithm, and then broadcast the log file and the log file summary to the blockchain network, for the member nodes to publish the log file and the log file summary to the blockchain based on the consensus mechanism.

The blockchain function module may send the log file summary to the service logic execution module. Then, the service logic execution module sends the log file summary to the paying user and/or the receiving user, for the paying user and/or the receiving user to query the blockchain for the log file by using the log file summary.

Further, the blockchain function module sends the log file summary to the service logic execution module if it is determined that the log file is published to the blockchain.

For the method shown in FIG. 3, in some embodiments, the service logic execution module is responsible for generating the log file. No complicated reconstruction needs to be performed on the service logic execution module, and the log file generating logic needs to be written into the service logic execution module. In addition, the service logic execution module is responsible for generating the log file, and may also customize the content of the log file. In this way, the log file is not only used for recording the account balance modification operation, but also may be used for recording other transaction-related information.

Figure 4:
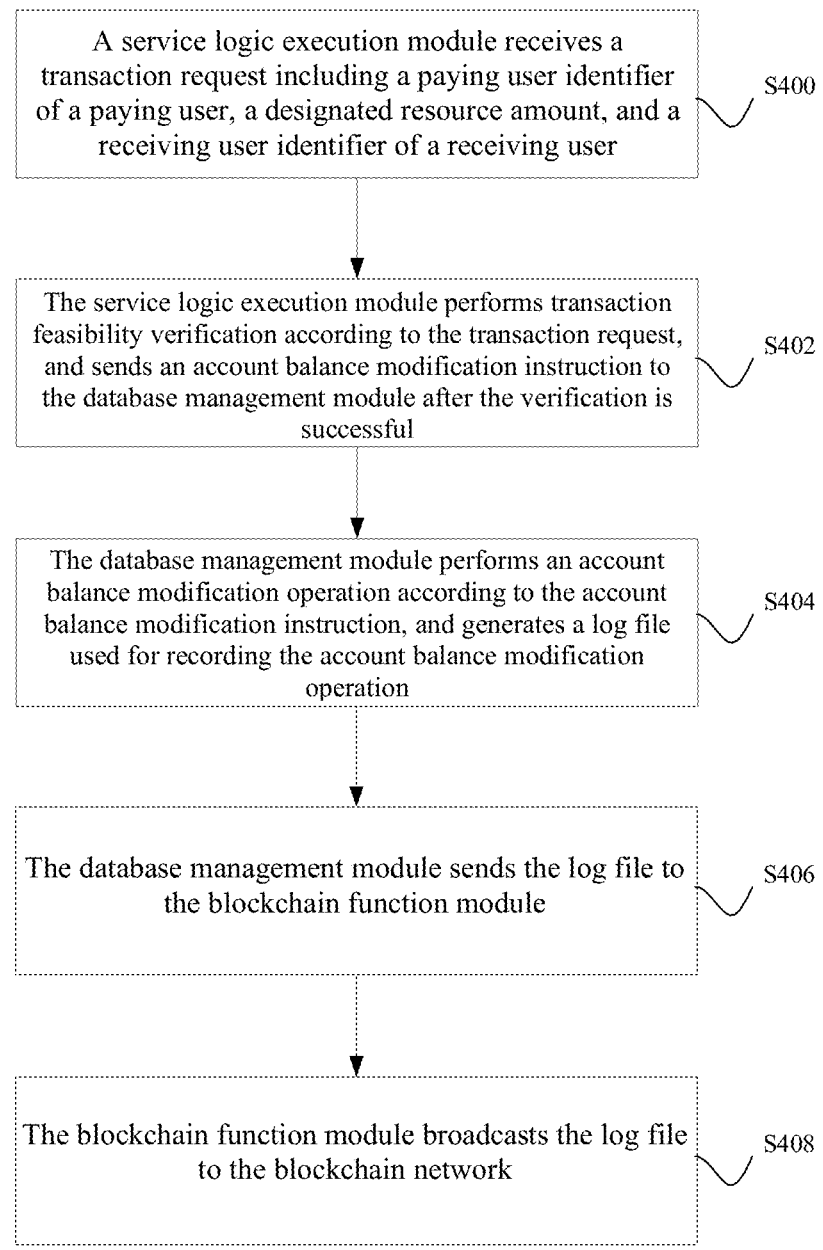
FIG. 4 is a schematic flowchart of another transaction method based on centralized settlement and blockchain attestation, according to some embodiments.

FIG. 4 is a schematic flowchart of another transaction method based on centralized settlement and blockchain attestation, according to some embodiments. The method includes the following steps:

S400. A service logic execution module receives a transaction request including a paying user identifier of a paying user, a designated resource amount, and a receiving user identifier of a receiving user.

In the method shown in FIG. 4, a blockchain network includes a plurality of member nodes, a virtual resource account is registered by a user with a designated member node, and the designated member node includes the service logic execution module, a database management module, and a blockchain function module.

S402. The service logic execution module performs transaction feasibility verification according to the transaction request, and sends an account balance modification instruction to the database management module after the verification is successful.

S404. The database management module performs an account balance modification operation according to the account balance modification instruction, and generates a log file used for recording the account balance modification operation.

In the method shown in FIG. 4, the service logic execution module is responsible for accepting the transaction request and performing the transaction feasibility verification. After the verification is successful, the service logic execution module may instruct the database management module to perform the account balance modification operation. That is, the designated resource amount is deducted from a virtual resource account corresponding to the paying user identifier, and the designated resource amount is added to a virtual resource account corresponding to the receiving user identifier.

In the method shown in FIG. 4, the database management module is responsible for generating the log file and sending the generated log file to the blockchain function module.

A person skilled in the art that, to ensure atomicity of a transaction, when performing data modification on a database, the database management module may first generate a database log recording a data modification operation, and then perform the data modification operation according to the database log.

It can be seen that, in the method shown in FIG. 4, the log file is the database log. Moreover, the database management module may generate the log file before performing the account balance modification operation.

S406. The database management module sends the log file to the blockchain function module.

S408. The blockchain function module broadcasts the log file to the blockchain network.

In step S408, the blockchain function module generates a log file summary corresponding to the log file according to the log file by using a hash algorithm, and then broadcasts the log file and the log file summary to the blockchain network, for the member nodes to publish the log file and the log file summary to a blockchain based on a consensus mechanism.

The blockchain function module may send the log file summary to the database management module. Then, the database management module sends the log file summary to the service logic execution module, and the service logic execution module sends the log file summary to the paying user and/or the receiving user, for the paying user and/or the receiving user to query the blockchain for the log file by using the log file summary.

Further, the blockchain function module sends the log file summary to the database management module if it is determined that the log file is published to the blockchain. In addition, the designated member node may alternatively send the log file summary to the paying user and/or the receiving user after it is determined that the log file is packed into a block.

In some embodiments, the database management module may return, in a timely manner, a modification success notification to the service logic execution module after performing the account balance modification operation. Alternatively, the database management module may not return a modification success notification temporarily after performing the account balance modification operation, but return the modification success notification and the log file summary together to the service logic execution module after receiving the log file summary returned by the blockchain function module.

Figure 5:
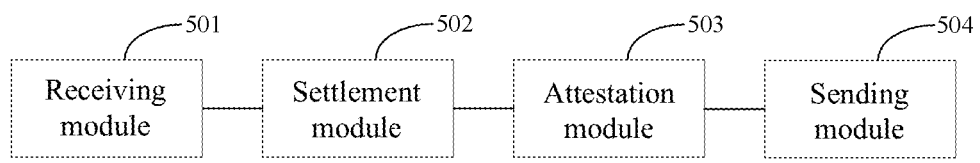
FIG. 5 is a schematic structural diagram of a transaction device based on centralized settlement and blockchain attestation, according to some embodiments.

Based on the transaction method based on centralized settlement and blockchain attestation shown in FIG. 1, an embodiment of this specification further correspondingly provides a transaction device based on centralized settlement and blockchain attestation. As shown in FIG. 5, a blockchain network includes a plurality of member nodes, the device is any of the member nodes, a virtual resource account is registered by a user with the device, and the device includes: a receiving module 501, configured to receive a transaction request including a paying user identifier of a paying user, a designated resource amount, and a receiving user identifier of a receiving user, the paying user being a user paying the designated resource amount, and the receiving user being a user receiving the designated resource amount; a settlement module 502, configured to perform transaction feasibility verification according to the transaction request, and perform an account balance modification operation after the verification is successful, the account balance modification operation including deducting the designated resource amount from a virtual resource account corresponding to the paying user identifier and adding the designated resource amount to a virtual resource account corresponding to the receiving user identifier; and an attestation module 503, configured to generate a log file used for recording the account balance modification operation, and broadcast the log file to the blockchain network, for the member nodes to publish the log file to a blockchain based on a consensus mechanism.

The attestation module 503 generates a log file summary corresponding to the log file according to the log file by using a hash algorithm, and then broadcasts the log file and the log file summary to the blockchain network, for the member nodes to publish the log file and the log file summary to the blockchain based on the consensus mechanism.

The device further includes: a sending module 504, configured to send the log file summary to the paying user and/or the receiving user, for the paying user and/or the receiving user to query the blockchain for the log file by using the log file summary.

The sending module 504 sends the log file summary to the paying user and/or the receiving user if it is determined that the log file is published to the blockchain.

Figure 6:
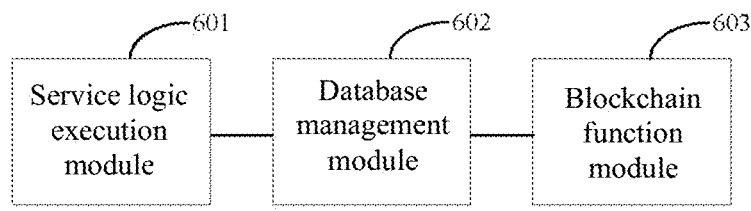
FIG. 6 is a schematic structural diagram of a transaction device based on centralized settlement and blockchain attestation, according to some embodiments.

Based on the transaction method based on centralized settlement and blockchain attestation shown in FIG. 3, an embodiment of this specification further correspondingly provides a transaction device based on centralized settlement and blockchain attestation. As shown in FIG. 6, a blockchain network includes a plurality of member nodes, the device is any of the member nodes, a virtual resource account is registered by a user with the device, and the device includes a service logic execution module 601, a database management module 602, and a blockchain function module 603.

The service logic execution module 601 receives a transaction request including a paying user identifier of a paying user, a designated resource amount, and a receiving user identifier of a receiving user, the paying user being a user paying the designated resource amount, and the receiving user being a user receiving the designated resource amount; performs transaction feasibility verification according to the transaction request, and sends an account balance modification instruction to the database management module after the verification is successful; and generates a log file used for recording an account balance modification operation, and sends the log file to the blockchain function module, the account balance modification operation including deducting the designated resource amount from a virtual resource account corresponding to the paying user identifier and adding the designated resource amount to a virtual resource account corresponding to the receiving user identifier.

The database management module 602 performs the account balance modification operation according to the account balance modification instruction.

The blockchain function module 603 broadcasts the log file to the blockchain network, for the member nodes to publish the log file to a blockchain based on a consensus mechanism.

The service logic execution module 601 generates the log file used for recording the account balance modification operation and recording other transaction-related information.

After performing the account balance modification operation, the database management module 602 returns a modification success notification to the service logic execution module.

After receiving the modification success notification, the service logic execution module 601 generates the log file used for recording the account balance modification operation.

The blockchain function module 603 generates a log file summary corresponding to the log file according to the log file by using a hash algorithm; broadcasts the log file and the log file summary to the blockchain network, for the member nodes to publish the log file and the log file summary to the blockchain based on the consensus mechanism; and sends the log file summary to the service logic execution module.

The service logic execution module 601 sends the log file summary to the paying user and/or the receiving user, for the paying user and/or the receiving user to query the blockchain for the log file by using the log file summary.

The blockchain function module 603 sends the log file summary to the service logic execution module if it is determined that the log file is published to the blockchain.

Figure 7:
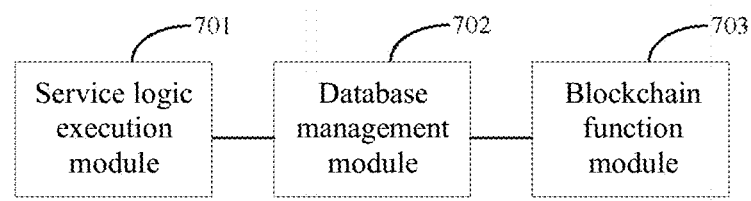
FIG. 7 is a schematic structural diagram of another transaction device based on centralized settlement and blockchain attestation, according to some embodiments.

Based on the transaction method based on centralized settlement and blockchain attestation shown in FIG. 4, an embodiment of this specification further correspondingly provides a transaction device based on centralized settlement and blockchain attestation. As shown in FIG. 7, a blockchain network includes a plurality of member nodes, the device is any of the member nodes, a virtual resource account is registered by a user with the device, and the device includes a service logic execution module 701, a database management module 702, and a blockchain function module 703.

The service logic execution module 701 receives a transaction request including a paying user identifier of a paying user, a designated resource amount, and a receiving user identifier of a receiving user, the paying user being a user paying the designated resource amount, and the receiving user being a user receiving the designated resource amount; and performs transaction feasibility verification according to the transaction request, and sends an account balance modification instruction to the database management module after the verification is successful.

The database management module 702 performs an account balance modification operation according to the account balance modification instruction, and generates a log file used for recording the account balance modification operation, the account balance modification operation including deducting the designated resource amount from a virtual resource account corresponding to the paying user identifier and adding the designated resource amount to a virtual resource account corresponding to the receiving user identifier; and sends the log file to the blockchain function module.

The blockchain function module 703 broadcasts the log file to the blockchain network, for the member nodes to publish the log file to a blockchain based on a consensus mechanism.

The blockchain function module 703 generates a log file summary corresponding to the log file according to the log file by using a hash algorithm; broadcasts the log file and the log file summary to the blockchain network, for the member nodes to publish the log file and the log file summary to the blockchain based on the consensus mechanism; and sends the log file summary to the database management module.

The database management module 702 sends the log file summary to the service logic execution module.

The service logic execution module 701 sends the log file summary to the paying user and/or the receiving user, for the paying user and/or the receiving user to query the blockchain for the log file by using the log file summary.

The blockchain function module 703 sends the log file summary to the database management module if it is determined that the log file is published to the blockchain.

The database management module 702 sends the log file summary and a modification success notification together to the service logic execution module.

In some embodiments, the various modules of the device in FIG. 5, the device in FIG. 6, and the device in FIG. 7 may each be implemented as software instructions or a combination of software and hardware. For example, the device in FIG. 5, the device in FIG. 6, and the device in FIG. 7 (or referred to as a system) may each include one or more processors (e.g., a CPU) and one or more non-transitory computer-readable storage memories coupled to the one or more processors and configured with instructions executable by the one or more processors to cause one or more components (e.g., the one or more processors) of the device to perform various steps and methods of the modules described above (e.g., with reference to the method embodiments). In some embodiments, the device in FIG. 5, the device in FIG. 6, and the device in FIG. 7 may each include a server, a mobile phone, a tablet computer, a PC, a laptop computer, another computing device, or a combination of one or more of these computing devices.

Figure 8:
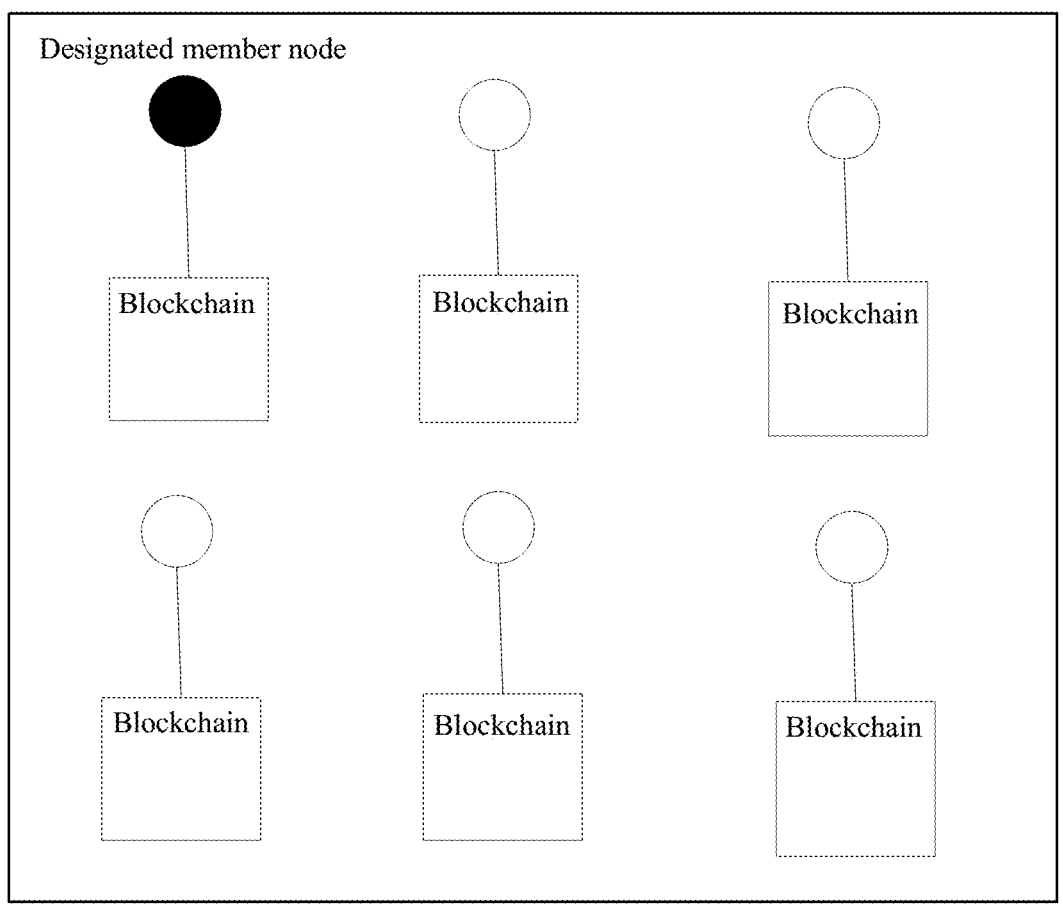
FIG. 8 is a schematic structural diagram of a transaction system based on centralized settlement and blockchain attestation, according to some embodiments.

FIG. 8 is a schematic structural diagram of a transaction system based on centralized settlement and blockchain attestation, according to some embodiments. The system includes a blockchain network formed by a plurality of member nodes, where a user can register a virtual resource account with a designated member node.

The designated member node receives a transaction request including a paying user identifier of a paying user, a designated resource amount, and a receiving user identifier of a receiving user, the paying user being a user paying the designated resource amount, and the receiving user being a user receiving the designated resource amount; performs transaction feasibility verification according to the transaction request, and performs an account balance modification operation after the verification is successful, the account balance modification operation including deducting the designated resource amount from a virtual resource account corresponding to the paying user identifier and adding the designated resource amount to a virtual resource account corresponding to the receiving user identifier; and generates a log file used for recording the account balance modification operation, and broadcasts the log file to the blockchain network.

Other member nodes and the designated member node publish the log file to a blockchain based on a consensus mechanism.

The designated member node generates a log file summary corresponding to the log file according to the log file by using a hash algorithm; broadcasts the log file and the log file summary to the blockchain network, for the member nodes to publish the log file and the log file summary to the blockchain based on the consensus mechanism; and sends the log file summary to the paying user and/or the receiving user, for the paying user and/or the receiving user to query the blockchain for the log file by using the log file summary.

The designated member node sends the log file summary to the paying user and/or the receiving user if it is determined that the log file is published to the blockchain.

Figure 9:
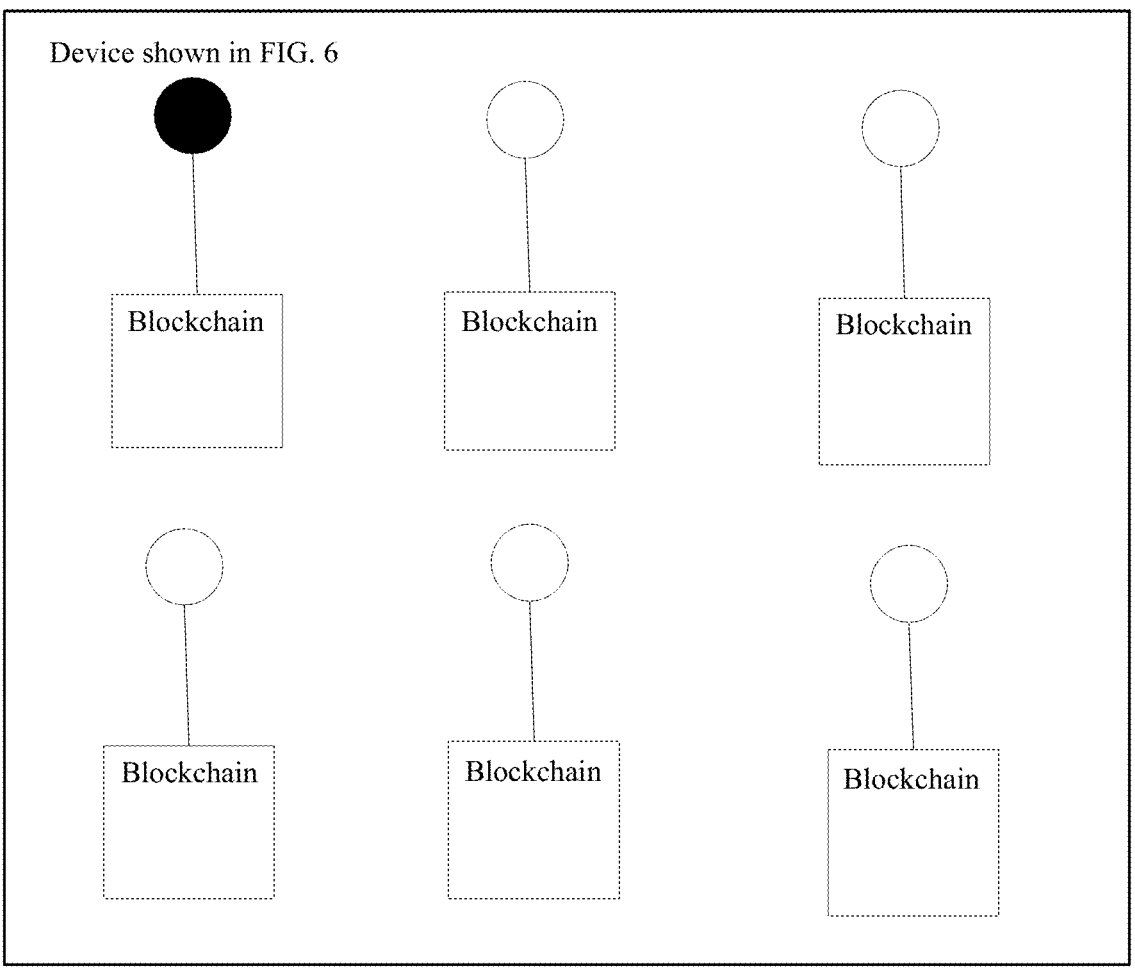
FIG. 9 is a schematic structural diagram of another transaction system based on centralized settlement and blockchain attestation, according to some embodiments.

FIG. 9 is a schematic structural diagram of another transaction system based on centralized settlement and blockchain attestation, according to some embodiments. The system includes a blockchain network formed by a plurality of member nodes, where each member node includes the device shown in FIG. 6, and a virtual resource account is registered by a user with the device.

Figure 10:
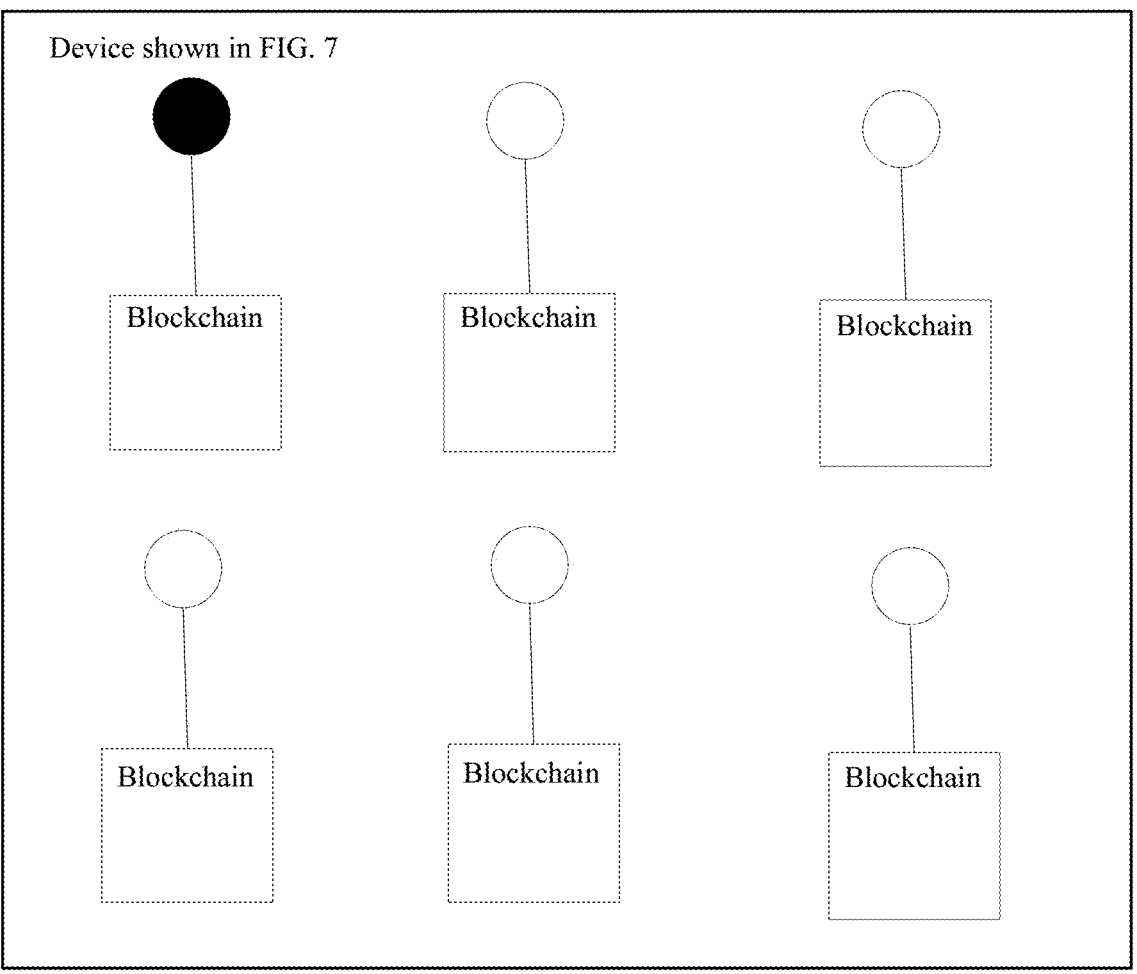
FIG. 10 is a schematic structural diagram of another transaction system based on centralized settlement and blockchain attestation, according to some embodiments.

FIG. 10 is a schematic structural diagram of another transaction system based on centralized settlement and blockchain attestation, according to some embodiments. The system includes a blockchain network formed by a plurality of member nodes, where each member node includes the device shown in FIG. 7, and a virtual resource account is registered by a user with the device.

An embodiment of this specification further provides a computer device, where a blockchain network includes a plurality of member nodes, the device is any of the member nodes, and a virtual resource account is registered by a user with the device.

The device includes at least a memory, a processor, and a computer program stored on the memory and executable on the processor. When executing the program, the processor implements functions of the method shown in FIG. 1.

Figure 11:
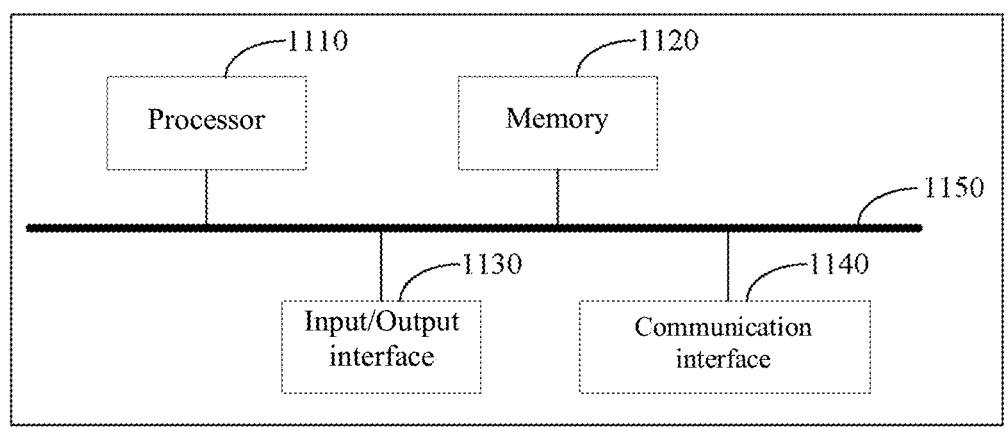
FIG. 11 is a schematic structural diagram of a computer device configured for the method shown in FIG. 1.

FIG. 11 is a schematic diagram of a more detailed hardware structure of a computer device, according to some embodiments. The device may include: a processor 1110, a memory 1120, an input/output interface 1130, a communication interface 1140, and a bus 1150. The processor 1110, the memory 1120, the input/output interface 1130, and the communication interface 1140 communicate with and connect to each other inside the device by using the bus 1150.

The processor 1110 may be implemented in a manner of a general central processing unit (CPU), a microprocessor, an application-specific integrated circuit (ASIC), or one or more integrated circuits, and is configured to execute a related program to implement the technical solutions provided in the embodiments of this specification.

The memory 1120 may be implemented in a form of a read-only memory (ROM), a random access memory (RAM), a static storage device, or a dynamic storage device. The memory 1120 may store an operating system and another application program. When the technical solutions provided in the embodiments of this specification are implemented by means of software or firmware, related program code is stored in the memory 1120 and is executed by the processor 1110.

The input/output interface 1130 is configured to connect to an input/output module, to implement input and output of information. The input/output module may be used as a component and configured in the device (not shown in the figure), or may be externally connected to the device, to provide corresponding functions. An input device may include a keyboard, a mouse, a touchscreen, a microphone, and various sensors. An output device may include a display, a speaker, a vibrator, and an indicator.

The communication interface 1140 is configured to connect to a communication module (not shown in the figure), to implement communication interaction between the device and another device. The communication module may implement communication in a wired manner (such as a USB and a network cable), or may implement communication in a wireless manner (such as a mobile network, WiFi, and Bluetooth).

The bus 1150 includes a path, for transmitting information between the components (for example, the processor 1110, the memory 1120, the input/output interface 1130, and the communication interface 1140) of the device.

In some embodiments, although the foregoing device shows only the processor 1110, the memory 1120, the input/output interface 1130, the communication interface 1140, and the bus 1150, in a detailed implementation process, the device may further include other components required by normal running. In addition, a person skilled in the art may understand that the device may alternatively include only components necessary for implementing the solution of this embodiment of this specification and not necessarily include all components shown in the figure.

An embodiment of this specification further provides a computer-readable storage medium storing a computer program. The program, when executed by a processor, implements functions of the method shown in FIG. 1.

The computer-readable medium includes a persistent medium and a non-persistent medium, a removable medium and a non-removable medium, which may implement storage of information by using any method or technology. The information may be a computer-readable instruction, a data structure, a module of a program, or other data. Examples of computer storage media include, but are not limited to, a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the present disclosure, the computer readable medium does not include transitory computer readable media (transitory media), such as a modulated data signal and a carrier.

It may be learned from description of the foregoing implementations that, a person skilled in the art may clearly understand that the embodiments of this specification may be implemented by using software in addition to a necessary universal hardware platform. Based on such an understanding, the technical solutions of the embodiments of this specification essentially or the part contributing to the existing technologies may be implemented in a form of a software product. The computer software product may be stored in a storage medium, such as a ROM/RAM, a hard disk, or an optical disc, and includes a plurality of instructions for instructing a computer device (which may be a personal computer, a server, or a network device) to perform the methods described in the embodiments or some parts of the embodiments of this specification.

The system, the method, the module or the unit described in the foregoing embodiments may be implemented by a computer chip or an entity, or implemented by a product having a certain function. A typical implementation device is a computer, and the specific form of the computer may be a personal computer, a laptop computer, a cellular telephone, a camera phone, a smartphone, a personal digital assistant, a media player, a navigation device, an email transceiver device, a game console, a tablet computer, a wearable device, or a combination thereof.

In this specification, the embodiments are described in a progressive manner. Reference may be made to each other for the same or a similar part of the embodiments. Each embodiment focuses on a difference from other embodiments. Especially, device embodiments are basically similar to a method embodiment, and therefore are described briefly; for related parts, refer to partial descriptions in the method embodiment. The method embodiment described above is merely an example. The modules described as separate parts may or may not be physically separate. During implementation of the solutions of the embodiments of this specification, the function of the modules may be implemented in the same piece of or a plurality of pieces of software and/or hardware. A part or all of the modules may be selected according to actual needs to achieve the objectives of the solutions of the embodiments. A person of ordinary skill in the art may understand and implement this specification without creative efforts.

The foregoing descriptions are merely detailed implementations of the embodiments of this specification. A person of ordinary skill in the art may make several improvements and modifications without departing from the principle of the embodiments of this specification and the improvements and modifications shall fall within the protection scope of the embodiments of this specification.

What is claimed is:

1. A method, at least a portion of the method being performed by a computing device comprising one or more processors, the method comprising:
   receiving, by a service logic execution module of a designated member node, a transaction request comprising a paying user identifier of a paying user, a designated resource amount, and a receiving user identifier of a receiving user, the paying user paying the designated resource amount, and the receiving user receiving the designated resource amount, wherein the designated member node is one of a plurality of member nodes of a blockchain network;
   performing, by the service logic execution module, transaction feasibility verification off the blockchain network according to the transaction request prior to the blockchain network performing consensus verification on the transaction request in order to reduce a computing burden of the consensus verification and to expedite transaction feasibility verification of the transaction request, wherein the transaction feasibility verification comprises verifying whether the transaction request is executable and whether the paying user has authorization to order the transaction request;
   sending, by the service logic execution module, an account balance modification instruction to a database management module of the designated member node in response to the transaction feasibility verification being successful;
   performing, by the database management module, an account balance modification operation off the blockchain network according to the account balance modification instruction prior to the blockchain network performing the consensus verification on the transaction request;
   generating, by the database management module, a log file recording the account balance modification operation, the account balance modification operation comprising deducting the designated resource amount from a virtual resource account corresponding to the paying user identifier and adding the designated resource amount to a virtual resource account corresponding to the receiving user identifier;
   sending, by the database management module, the log file to a blockchain function module of the designated member node prior to the blockchain network performing the consensus verification on the transaction request; and
   broadcasting, by the blockchain function module, a blockchain transaction comprising the log file to the blockchain network, for the plurality of member nodes to publish the blockchain transaction to a blockchain based on a consensus mechanism.

2. The method according to claim 1, wherein broadcasting, by the blockchain function module, the blockchain transaction to the blockchain network comprises:
   generating, by the blockchain function module, a log file summary by applying a hash algorithm to the log file; and
   broadcasting, by the blockchain function module, the blockchain transaction to the blockchain network, for the plurality of member nodes to publish the log file and the log file summary to the blockchain based on the consensus mechanism, wherein the blockchain transaction comprises the log file and the log file summary.

3. The method according to claim 2, further comprising:
   sending, by the blockchain function module, the log file summary to the database management module;
   sending, by the database management module, the log file summary to the service logic execution module; and
   sending, by the service logic execution module, the log file summary to the paying user and/or the receiving user, for the paying user and/or the receiving user to query the blockchain for the log file by using the log file summary.

4. The method according to claim 3, wherein sending, by the blockchain function module, the log file summary to the database management module comprises:
   determining, by the blockchain function module, whether the log file is published to the blockchain by querying the blockchain; and
   in response to determining that the log file is published to the blockchain, sending, by the blockchain function module, the log file summary to the database management module.

5. The method according to claim 3, wherein sending, by the database management module, the log file summary to the service logic execution module comprises:
   sending, by the database management module, the log file summary and a modification success notification of the account balance modification operation to the service logic execution module.

6. The method according to claim 1, wherein broadcasting the blockchain transaction comprising the log file to the blockchain network comprises:
   broadcasting the blockchain transaction to the blockchain network, for the plurality of member nodes to perform consensus verification on the blockchain transaction without performing the transaction feasibility verification on the transaction request.

7. The method according to claim 1, wherein:
   the log file comprises a software operation history of performing the account balance modification operation.

8. One or more non-transitory computer-readable storage media storing instructions executable by one or more processors, wherein execution of the instructions causes the one or more processors to perform operations comprising:
   receiving a transaction request comprising a paying user identifier of a paying user, a designated resource amount, and a receiving user identifier of a receiving user, the paying user paying the designated resource amount, and the receiving user receiving the designated resource amount;
   performing transaction feasibility verification off the blockchain network according to the transaction request prior to the blockchain network performing consensus verification on the transaction request in order to reduce a computing burden of the consensus verification and to expedite transaction feasibility verification of the transaction request, wherein the transaction feasibility verification comprises verifying whether the transaction request is executable and whether the paying user has authorization to order the transaction request;
   generating an account balance modification instruction in response to the transaction feasibility verification being successful;
   performing an account balance modification operation off the blockchain network according to the account balance modification instruction prior to the blockchain network performing the consensus verification on the transaction request;

generating a log file recording the account balance modification operation prior to the blockchain network performing the consensus verification on the trans action request, the account balance modification operation comprising deducting the designated resource amount from a virtual resource account corresponding to the paying user identifier and adding the designated resource amount to a virtual resource account corresponding to the receiving user identifier; and broadcasting a blockchain transaction comprising the log file to the blockchain network, for a plurality of member nodes of the blockchain network to publish the blockchain transaction to a blockchain based on a consensus mechanism.

9. The one or more non-transitory computer-readable storage media according to claim 8, wherein broadcasting the blockchain transaction comprising the log file to the blockchain network comprises:

broadcasting the blockchain transaction to the blockchain network, for the plurality of member nodes to perform consensus verification on the blockchain transaction without performing the transaction feasibility verification on the transaction request.

10. The one or more non-transitory computer-readable storage media according to claim 8, wherein broadcasting the blockchain transaction to the blockchain network comprises:

generating a log file summary by applying a hash algorithm to the log file; and broadcasting the blockchain transaction to the blockchain network, for the plurality of member nodes to publish the log file and the log file summary to the blockchain based on the consensus mechanism, wherein the blockchain transaction comprises the log file and the log file summary.

11. The one or more non-transitory computer-readable storage media according to claim 10, wherein the operations further comprise:

sending the log file summary to the paying user and/or the receiving user, for the paying user and/or the receiving user to query the blockchain for the log file by using the log file summary.

12. The one or more non-transitory computer-readable storage media according to claim 8, wherein:

the log file comprises a software operation history of performing the account balance modification operation.

13. The one or more non-transitory computer-readable storage media according to claim 10, wherein the operations further comprise:

determining whether the log file is published to the blockchain by querying the blockchain; and in response to determining that the log file is published to the blockchain, sending the log file summary.

14. The one or more non-transitory computer-readable storage media according to claim 10, wherein the operations further comprise:

sending the log file summary and a modification success notification of the account balance modification operation.

15. A system comprising one or more processors and one or more non-transitory computer-readable memories coupled to the one or more processors and configured with instructions executable by the one or more processors to cause the system to perform operations comprising:

receiving a transaction request comprising a paying user identifier of a paying user, a designated resource amount, and a receiving user identifier of a receiving user, the paying user paying the designated resource amount, and the receiving user receiving the designated resource amount;

performing transaction feasibility verification off the blockchain network according to the transaction request prior to the blockchain network performing consensus verification on the transaction request in order to reduce a computing burden of the consensus verification and to expedite transaction feasibility verification of the transaction request, wherein the transaction feasibility verification comprises verifying whether the transaction request is executable and whether the paying user has authorization to order the transaction request;

generating an account balance modification instruction in response to the transaction feasibility verification being successful;

performing an account balance modification operation off the blockchain network according to the account balance modification instruction prior to the blockchain network performing the consensus verification on the transaction request;

generating a log file recording the account balance modification operation prior to the blockchain network performing the consensus verification on the transaction request, the account balance modification operation comprising deducting the designated resource amount from a virtual resource account corresponding to the paying user identifier and adding the designated resource amount to a virtual resource account corresponding to the receiving user identifier; and broadcasting a blockchain transaction comprising the log file to the blockchain network, for a plurality of member nodes of the blockchain network to publish the blockchain transaction to a blockchain based on a consensus mechanism.

16. The system according to claim 15, wherein broadcasting the blockchain transaction comprising the log file to the blockchain network comprises:

broadcasting the blockchain transaction to the blockchain network, for the plurality of member nodes to perform consensus verification on the blockchain transaction without performing the transaction feasibility verification on the transaction request.

17. The system according to claim 15, wherein broadcasting the blockchain transaction to the blockchain network comprises:

generating a log file summary by applying a hash algorithm to the log file; and broadcasting the blockchain transaction to the blockchain network, for the plurality of member nodes to publish the log file and the log file summary to the blockchain based on the consensus mechanism, wherein the blockchain transaction comprises the log file and the log file summary.

18. The system according to claim 17, wherein the operations further comprise:

sending the log file summary to the paying user and/or the receiving user, for the paying user and/or the receiving user to query the blockchain for the log file by using the log file summary.

19. The system according to claim 15, wherein:

the log file comprises a software operation history of performing the account balance modification operation.

20. The system according to claim 17, wherein the operations further comprise:
    determining whether the log file is published to the blockchain by querying the blockchain; and
    in response to determining that the log file is published to the blockchain, sending the log file summary.

\* \* \* \* \*